(12) United States Patent
Nakamura et al.

(10) Patent No.: US 12,017,526 B2
(45) Date of Patent: Jun. 25, 2024

(54) WORK MACHINE

(71) Applicants: Kubota Corporation, Osaka (JP); Saito Noki Seisakusho Co., Ltd., Sakata (JP)

(72) Inventors: Taro Nakamura, Sakai (JP); Junichiro Takiguchi, Sakai (JP); Yusuke Minakata, Amagasaki (JP); Kohei Kawaguchi, Sakai (JP); Sohei Wakabayashi, Sakai (JP); Hiroki Saito, Sakata (JP); Masayuki Kaneko, Sakata (JP); Koshi Kuromi, Sakata (JP); Shingo Mimae, Sakata (JP); Hiroshi Ito, Sakata (JP)

(73) Assignees: Kubota Corporation, Osaka (JP); Saito Noki Seisakusho Co., Ltd., Sakata (JP)

( * ) Notice: Subject to any disclaimer, the term of this patent is extended or adjusted under 35 U.S.C. 154(b) by 806 days.

(21) Appl. No.: 17/059,746

(22) PCT Filed: Jun. 18, 2019

(86) PCT No.: PCT/JP2019/024103
§ 371 (c)(1),
(2) Date: Nov. 30, 2020

(87) PCT Pub. No.: WO2019/244887
PCT Pub. Date: Dec. 26, 2019

(65) Prior Publication Data
US 2021/0219489 A1    Jul. 22, 2021

(30) Foreign Application Priority Data

Jun. 19, 2018 (JP) .................................. 2018-116430
Jun. 19, 2018 (JP) .................................. 2018-116431

(51) Int. Cl.
*B60K 15/063* (2006.01)
*A01D 34/66* (2006.01)
(Continued)

(52) U.S. Cl.
CPC ............ *B60K 15/063* (2013.01); *A01D 34/66* (2013.01); *A01D 34/6806* (2013.01); *A01D 2101/00* (2013.01); *B60K 5/12* (2013.01)

(58) Field of Classification Search
CPC ........................... B60K 15/063; B60K 15/067
See application file for complete search history.

(56) References Cited

U.S. PATENT DOCUMENTS 4,757,872 A * 7/1988 Inomata ................. B60K 13/04
                                                    180/215
4,790,273 A   12/1988 Oguri et al.
(Continued)

FOREIGN PATENT DOCUMENTS

EP      0279446 A2    8/1988
FR      3052424 A1   12/2017
(Continued)

OTHER PUBLICATIONS

Machine Translation of JP-H11322274-A (Year: 1999).*

*Primary Examiner* — Kevin Hurley
(74) *Attorney, Agent, or Firm* — The Webb Law Firm

(57) ABSTRACT

There is configured a work machine whose engine and fuel tank will not be damaged at time of a work even when the engine and the fuel tank are arranged with offset to one side in the left/right direction of the machine body. The work machine includes a machine body that can travel with left and right front wheels and left and right rear wheels and an implement supported to the machine body. An engine driving the front wheels, the rear wheels and the implement and a fuel tank are disposed between the front wheels and the rear wheels in a front/rear direction of the machine body and at positions offset to further outer side than the left/right center of the machine body. There is provided a protection member which protrudes to a further outer side than an outer end position of the fuel tank in an offset direction of the fuel tank.

6 Claims, 3 Drawing Sheets

(51) Int. Cl.
    *A01D 34/68*       (2006.01)
    *A01D 101/00*    (2006.01)
    *B60K 5/12*        (2006.01)

(56) References Cited

U.S. PATENT DOCUMENTS

| | | | |
|---|---|---|---|
| 5,676,117 A | | 10/1997 | Williams |
| 5,836,733 A | * | 11/1998 | Moses ................... B66F 9/0655 |
| | | | 414/718 |
| 7,364,002 B2 | * | 4/2008 | Mabuchi ................ B62D 25/20 |
| | | | 180/311 |
| 2005/0217222 A1 | | 10/2005 | Hsu et al. |
| 2016/0121721 A1 | | 5/2016 | Lyle et al. |
| 2016/0129783 A1 | | 5/2016 | Tamura |

FOREIGN PATENT DOCUMENTS

| | | | |
|---|---|---|---|
| JP | 6320966 A | | 11/1994 |
| JP | 8118966 A | | 5/1996 |
| JP | H11322274 A | * | 11/1999 |
| JP | 3129006 U | | 1/2007 |
| JP | 200783825 A | | 4/2007 |
| JP | 201667229 A | | 5/2016 |
| JP | 201689615 A | | 5/2016 |

\* cited by examiner

WORK MACHINE

CROSS-REFERENCE TO RELATED APPLICATIONS

This application is the United States national phase of International Application No. PCT/JP2019/024103 filed Jun. 18, 2019, and claims priority to Japanese Patent Application Nos. 2018-116430 and 2018-116431, both filed Jun. 19, 2018, the disclosures of which are hereby incorporated by reference in their entirety.

BACKGROUND OF THE INVENTION

Field of the Invention

The present invention relates to a work machine configured to perform, in association with traveling thereof, a utility work at a level relatively near the ground surface.

Description of Related Art

As a work machine having the above-described arrangement, Patent Document 1 discloses a technique relating to a mower having wheels on front and rear sides and left and right sides of a machine body, a cutter blade disposed at a center position of the machine body, and an engine mounted on the machine body for driving the wheels and the cutter blade.

The work machine (mower) disclosed in this Patent Document 1 is configured such that right and left front wheels and right and left rear wheels are steerable and driven by driving power from the engine. Further, at the center position of the machine body, there is provided a cutter blade supported to be rotatable about a vertically oriented rotational axis and this cutter blade is driven by driving power from the engine.

Further, with the work machine (mower) disclosed in Japanese Unexamined Patent Application Publication No. 2016-67229 (Patent Document 1), steering operations are possible by remote control operations.

Patent Document 1: Japanese Unexamined Patent Application Publication No. 2016-67229

SUMMARY OF THE INVENTION

The mower disclosed in Patent Document 1 is configured to allow a grass mowing work by a remote control operation so as to protect a worker from adverse influence even at an inclined land where rollover of the machine body is possible.

Further, in a work at an inclined land, in order to prevent rollover of the machine body, it is also conceivable to dispose a heavy object on one side in the left/right direction, in addition to lowering of the center of gravity of the machine body. From this view point, according to Patent Document 1, a battery is arranged on one side in the left/right direction of the machine body so that the battery may act as a "balance weight".

(1) Here, suppose an arrangement in which an engine and a fuel tank are disposed at low positions on one side in the left/right direction of the machine body in order to prevent rollover of the machine body at time of a work at an inclined land. With the work machine supposed as above, it was conceivable that a protruding object, a grass or a tree, etc. (to be referred to as "vegetation" hereinafter) present on the ground surface may come into contact with the engine and the fuel tank, thus resulting in damage to the engine and/or the fuel tank.

Especially, in the case of an arrangement in which an oil feeding cylinder is arranged on outer end side of the machine body, it was conceivable that a protruding object, a vegetation (grass, tree or the like) present on the ground surface may come into contact with an oil feeding pipe or a cap of the oil feeding pipe, thus inviting damage to the oil feeding pipe or inadvertent loosening of the cap.

For the reason mentioned above, there is a need for a work machine whose engine and fuel tank will not be damaged at time of a work even when the engine and the fuel tank are arranged with offset to one side in the left/right direction of the machine body.

(2) Moreover, here, suppose the arrangement in which an engine and a fuel tank are disposed at low positions on one side in the left/right direction of the machine body in order to prevent rollover of the machine body at time of a work at an inclined land. With the work machine supposed as above, dust blown up from the ground surface at the time of work may be suctioned by an air cleaner of the engine, thus advancing the replacement timing of an air cleaner element disadvantageously. Especially, in the case of an arrangement where the air cleaner is disposed in close vicinity of the front wheels or the rear wheels, it was conceivable that dust picked and flipped up by the wheels can be easily suctioned by the air cleaner, so that a small stone or the like flipped up by the wheels may come into contact with the air cleaner, thereby damaging it.

For the reasons mentioned above, there is a need for a work machine which suppresses increase in a suction amount of dust by the air cleaner even in an arrangement wherein the engine is arranged with offset to one side in the left/right direction of the machine body and the air cleaner of the engine is disposed at a low position.

(1) A solution to cope with Object (1) above is as follows.

According to a characterizing feature of a work machine relating to the present invention, the work machine comprises:

a machine body that can travel with left and right front wheels and left and right rear wheels; and an implement supported to the machine body;

wherein an engine driving the front wheels, the rear wheels and the implement and a fuel tank reserving fuel for the engine are disposed between the front wheels and the rear wheels in a front/rear direction of the machine body and at positions offset to further outer side than the left/right center of the machine body; and there is provided a protection member which protrudes to a further outer side than an outer end position of the fuel tank in an offset direction as seen in a plan view.

With this characterizing feature, even when e.g. objects such as vegetation (grass, tree, etc.) present on the ground surface may approach the portion of the machine body where the fuel tank is disposed in the course of traveling of the machine body, the protection member will come into contact with these objects to push them in the direction away from the machine body in association with traveling of the machine body. Thus, contact will hardly occur between the vegetation on the ground surface and the fuel tank.

Therefore, there has been realized a work machine whose engine and fuel tank will not be damaged at time of a work even when the engine and the fuel tank are arranged with offset to one side in the left/right direction of the machine body.

Alternatively, preferably, the work machine further comprises:
an oil feeding pipe which extends upwards from the outer end position of the fuel tank in the offset direction as seen in the plan view; and
a cap detachably attached to an upper end of the oil feeding pipe;
wherein the protection member is disposed to protrude to the further outer side in the offset direction than an outer circumference of the cap.

With the above-described arrangement, in the course of traveling of the machine body, even if e.g. vegetation on the ground surface may approach the cap, the protection member will come into contact with these objects to push them in the direction away from the machine body in association with traveling of the machine body. Thus, damaging contact between the vegetation on the ground surface and the fuel tank and inadvertent detachment of the cap will hardly occur.

Alternatively, preferably:
as seen in the plan view, an outer end position of the protection member in the offset direction protrudes to further outer side than a virtual line which joins an outer end position of the front wheels in the offset direction and an outer end position of the rear wheels in the offset direction.

With the above-described arrangement, even in case a work is performed in an environment in the presence of vegetation tilting from the lateral direction of the machine body toward the center thereof, the protection member will come into contact with base ends of these, thus preventing contact between the fuel tank and the vegetation.

Alternatively, the protection member may comprise a plate-like member having an arc-shaped outer edge which bulges gently at its center position in the front/rear direction as seen in the plan view.

With the above-described arrangement, simply with attachment of the plate-like member to a lateral portion of the machine body, vegetation present on the ground surface can be pushed away smoothly, so that the protection of the fuel tank can be provided reliably. And, in the case of an arrangement in which the engine is disposed in close vicinity of this fuel tank, protection of the engine too can be provided reliably.

(2) A solution to cope with Object (2) above is as follows.

According to a characterizing feature of a work machine relating to the present invention, the work machine comprises:
a machine body that can travel with left and right front wheels and left and right rear wheels; and
an implement supported to the machine body;
wherein an engine driving the front wheels, the rear wheels and the implement is disposed between the front wheels and the rear wheels in a front/rear direction of the machine body and at a position offset to the outer side than the left/right center of the machine body; and
wherein an air cleaner for the engine is disposed at a position opposed to the front wheels or the rear wheels in a front/rear direction; and
wherein a dustproof member is provided between the air cleaner and the front wheels or the rear wheels opposed to the air cleaner.

For instance, in the case of a grass mowing work being performed by an implement, it is also conceivable that dust generated in association with the grass mowing work may be blown up into the space between the air cleaner and the wheels opposed to this air cleaner. On the other hand, according to the above-described characterizing arrangement, a dustproof member is provided between the air cleaner and the front wheels or the rear wheels opposed to this air cleaner. So that, it becomes possible to prevent the phenomenon of the dust blow up into this pace being directly suctioned into the air cleaner. Further, this arrangement prevents a phenomenon of dust, small stones or the like flipped up by the wheels being scattered toward the air cleaner to be suctioned in this air cleaner and a phenomenon of the dust coming into contact with the air cleaner to damage this air cleaner.

Therefore, there has been realized a work machine which suppresses increase in a suction amount of dust by the air cleaner even in an arrangement wherein the engine is arranged with offset to one side in the left/right direction of the machine body and the air cleaner of the engine is disposed at a low position. And, this arrangement can suppress also the phenomenon of the air cleaner being damaged by small stones or like flipped up by the wheels.

Alternatively, the dustproof member may comprise a plate member having a wide width in the left/right direction of the machine body so as to cover an area extending from a position downwardly of the air cleaner toward the front wheels or the rear wheels opposed to the air cleaner.

With this arrangement, a dustproof member constituted of a wide plate member is arranged in an area extending from the lower side of the air cleaner to the wheels opposed to this air cleaner. Thus, dust blown up from the ground surface can be blocked in a reliable manner.

Alternatively, an extension end of the dustproof member reaches an upper side of the front wheels or the rear wheels opposed to the air cleaner.

With the above-described arrangement, the phenomenon of small stones or dust flipped up by the wheels coming into direct contact with the air cleaner can be prevented reliably.

DETAILED DESCRIPTION OF THE PREFERRED EMBODIMENTS

Next, an embodiment of the present invention will be explained with reference to the accompanying drawings.
[Basic Configuration]

Figure 1:
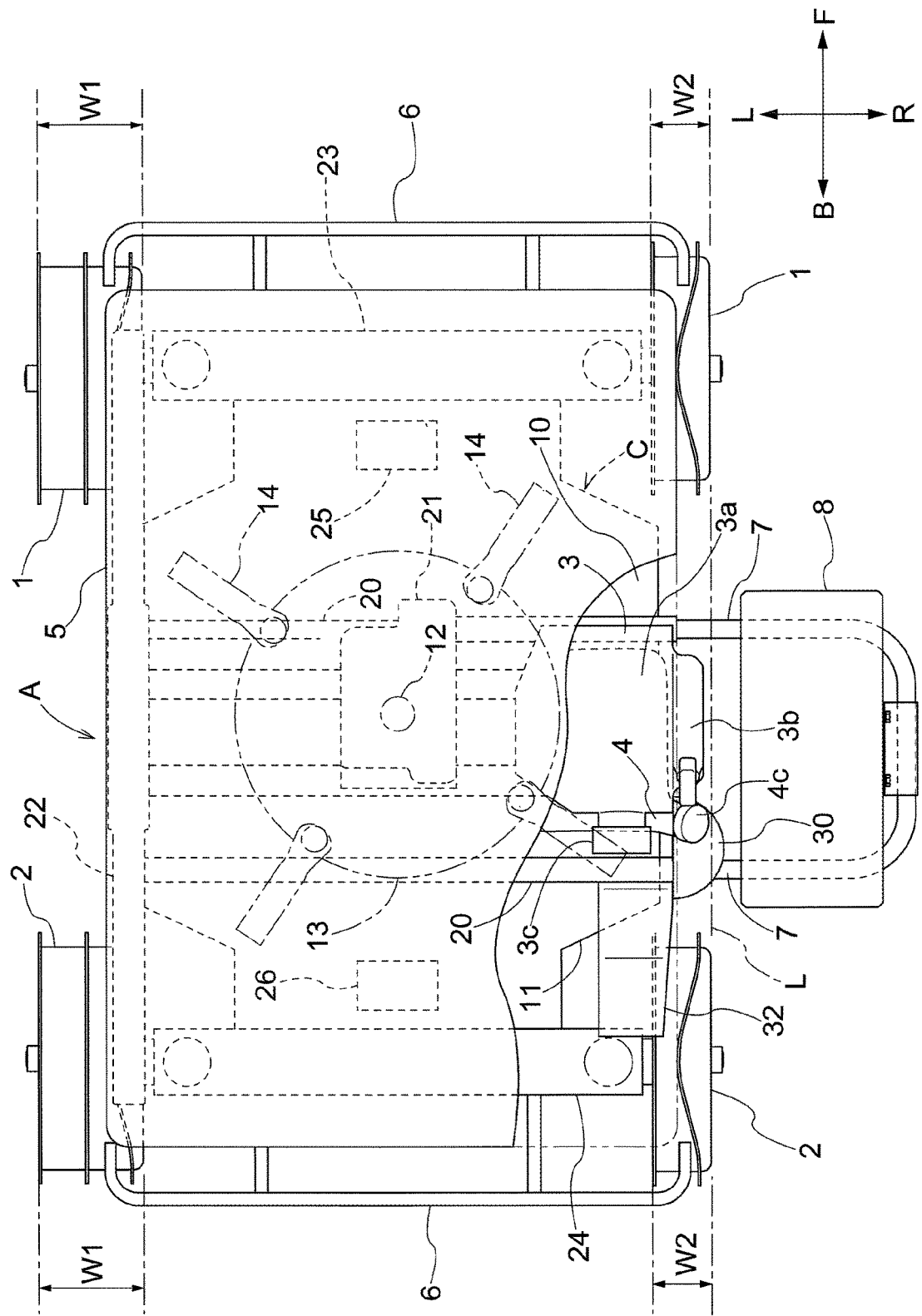
FIG. 1 is a plan view showing a mower with a portion thereof being cut away.
Figure 2:
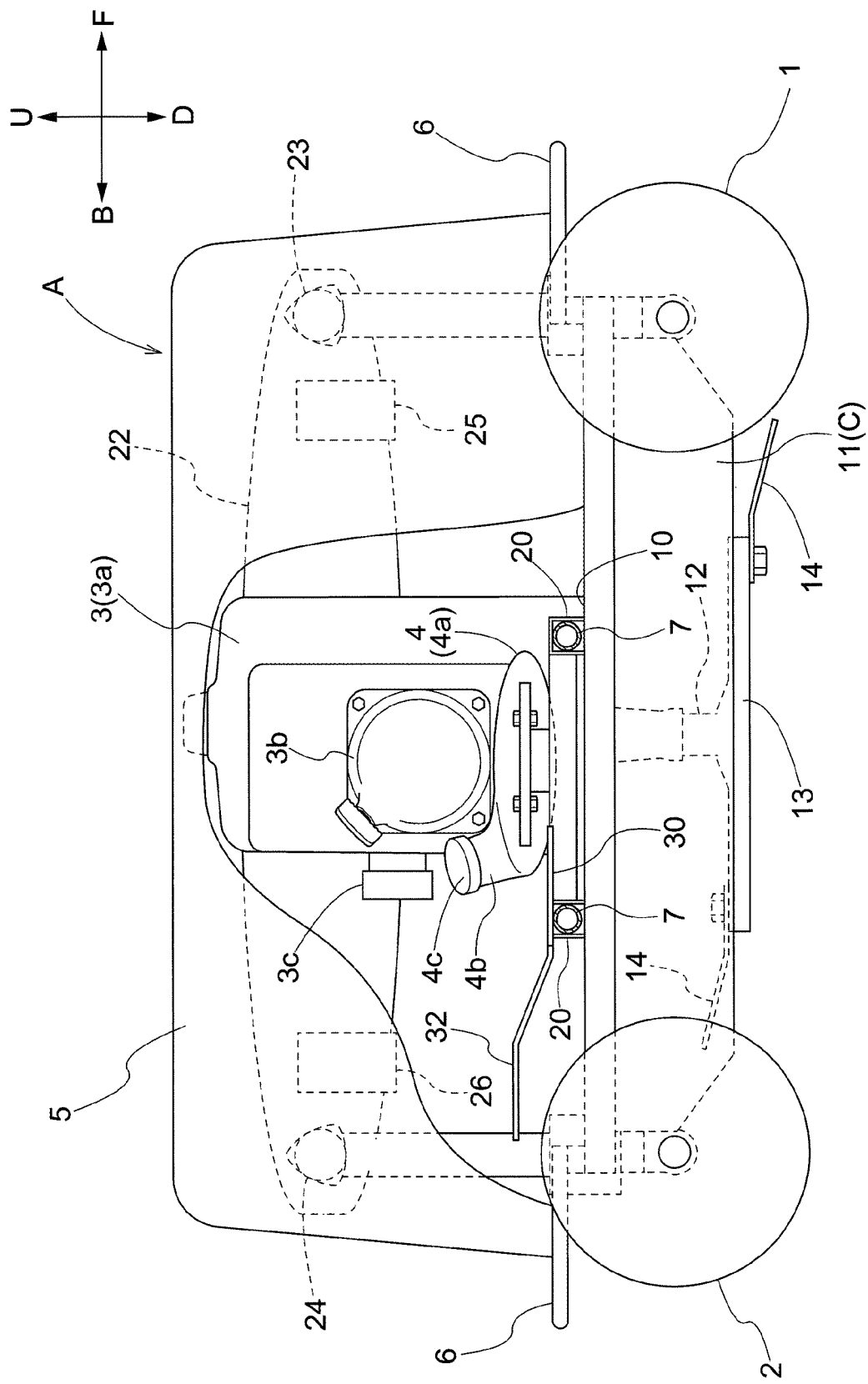
FIG. 2 is a side view showing the mower with a portion thereof being cut away.

As shown in FIG. 1 and FIG. 2, a mower as an example of a work machine includes a cutter blade housing C mounted on a machine body A configured to be capable of traveling with left and right front wheels 1 and left and right rear wheels 2, cutter blades 14 accommodated in the cutter blade housing C, an engine 3 that drives the left and right front wheels 1, the left and right rear wheels 2 and the cutter blades 14, and a fuel tank 4 provided downwardly of the engine 3.

As shown in FIGS. 1 and 2, a sign F denotes "front direction", a sign B denotes "rear direction", a sign R denotes "right direction", a sign L denotes "left direction", a sign U denotes "upper direction" and a sign D denotes "lower direction", respectively.

With this mower, the cutter blade housing C in the form of a downwardly opened bowl, the plurality of cutter blades 14 accommodated therein, and a driving system for driving the plurality of cutter blades 14 together constitute an "implement" (a utility implement). The engine 3 and the fuel tank 4 are disposed at positions offset to the right outer side relative to the center of the machine body A in the left/right direction.

As shown in FIG. 1 and FIG. 2, the machine body A includes a body 5 formed of plate metal or resin configured to cover the engine 3, the fuel tank 4, a main transmission case 21, a traveling transmission case 22, etc. And, bumpers 6 are provided at the front end portion and the rear end portion of this body 5.

With this mower, inside the body 5, there is provided a receiver (not shown) so that steering operations of the left and right front wheels 1 and the left and right rear wheels 2, forward traveling and reverse traveling, throttle adjustment of the engine 3, etc. can all be effected by remote control operations via wireless signals.

This mower is configured to be capable of performing a grass mowing work on an inclined surface (a slope) such as an embankment of a road, etc. Thus, in order to prevent rollover of the machine body A on the inclined surface, the engine 3 and the fuel tank 4 are disposed at positions offset to one side in the left/right direction of the machine body (the right side in this embodiment) and at low positions. Further, of the left and right front wheels 1 and rear wheels 2, the ones on the left side have a width W1 which is set greater than a width W2 of the ones on the right side.

With this mower, for the sake of improvement of rollover protection performance on an inclined surface, an auxiliary frame 7 extends to the right outer side from the right side face of the machine body A and a balancer 8 is attached to this auxiliary frame 7. Incidentally, the auxiliary frame 7 can be detached from the machine body A.

For performing a grass mowing work on an inclined surface with the above-described arrangement, the machine body A will be caused to travel with the right side of the machine body A being placed constantly on the higher side of the sloped surface, thus placing the engine 3, the fuel tank 4 and the balancer 8 on the higher side, so that there is realized a grass mowing work with effective prevention of rollover of the machine body A due to the wide ground-contacting faces of the left side front wheel 1 and the left side rear wheel 2.

[Cutter Blade Housing]

As shown in FIG. 1 and FIG. 2, the cutter blade housing C includes a vertically oriented vertical wall 11 at a portion surrounding an outer circumferential portion of a flat upper wall 10. A rotary disc 13 is attached to a lower end of a drive shaft 12 which vertically extends through the center portion of the upper wall 10 of this cutter blade housing C and in the outer circumference of the rotary disc 13, the plurality of plate-like cutter blades 14 are provided.

With the above-described arrangement, in operation, as the drive shaft 12 is rotatably driven, the rotary disc 13 and the plurality of cutter blades 14 are rotated together, thus cutting (mowing) vegetation (grass, tree or the like) present on the ground surface.

[Driving Arrangement]

A pair of main frames 20 are mounted under mutually parallel layout under horizontally oriented posture at positions on the upper wall 10 of the cutter blade housing C. And, with offset adjacent to the outer end in a right direction R of this main frame 20, the engine 3 and the fuel tank 4 are supported.

The cross sectional shape of the main frame 20 is an angular U-shape and provided under a posture downwardly opened.

The base end portion of the above-described auxiliary frame 7 is accommodated in the inner space of this main frame 20 to be insertable to and withdrawable therefrom.

At the left/right center of the machine body A, the main transmission case 21 is disposed to be supported to the main frame 20 and on the side opposite the engine 3 relative to this main transmission case 21, the traveling transmission case 22 is disposed. At a front position of the machine body A, a front drive case 23 is disposed and at a rear position of the machine body A, a rear drive case 24 is disposed.

With this mower, driving power of the engine 3 is transmitted to the main transmission case 21 and driving power from this main transmission case 21 is transmitted via the drive shaft 12 and then the rotary disc 13 to the cutter blades 14, thus enabling a mowing work of vegetations or the like. Further, the driving power from the main transmission case 21 is transmitted to the traveling transmission case 22 and transmitted further from the front drive case 23 to the left and right front wheels 1 and transmitted from the rear drive case 24 to the left and right rear wheels 2, thus enabling traveling of the machine body A.

Incidentally, though not shown, in a transmission section for transmitting the driving power of the engine 3 to the main transmission case 21, there are provided a centrifugal clutch and a brake for applying a braking force to the entire driving system. The main transmission case 21 incorporates an implement clutch mechanism for transmitting or not transmitting the driving power to the drive shaft 12 and a forward/reverse switchover mechanism for switching the rotational direction of the driving power to the transmitted to the traveling transmission case 22 between the forward direction and the reverse direction.

[Steering Operation Arrangement, etc.]

The left and right front wheels 1 and the left and right rear wheels 2 are supported to the machine body A to be steerable. And, the left and right front wheels 1 are interlocked via e.g. a tie rod, to be steerable by a driving power of a front steering motor 25. Similarly, the left and right rear wheels 2 are interlocked via e.g. a tie rod, to be steerable by a driving power of a rear steering motor 26.

And, the steering operations of the front and rear wheels by the above-described traveling operational arrangement, switching over between the forward traveling and the reverse traveling and the driving power transmitting and non-transmitting operations of the implement clutch mechanism, etc. are controlled from a remote site via wireless signals described above.

[Arrangement of Protecting Engine and Fuel Tank]

Figure 3:
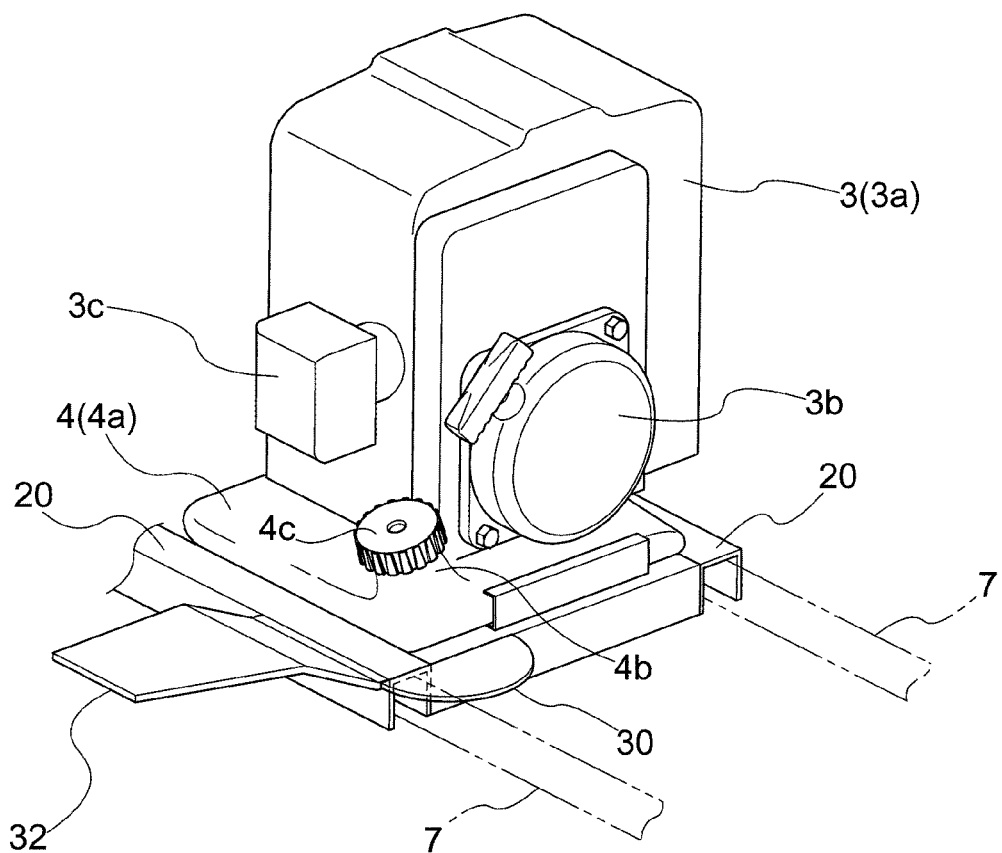
FIG. 3 is a perspective view showing a portion of an engine and a fuel tank.

As shown in FIGS. 1 through 3, the engine 3 includes an engine main body 3a, a recoil starter 3b disposed at the right end position of the engine main body 3a and an air cleaner 3c disposed at a rear face position (position opposed to the rear wheel 2) of the engine main body 3a.

Under the engine 3, a tank main body 4a of the fuel tank 4 is disposed and as seen in a plan view, a portion of the tank main body 4a is exposed on the rear side of the recoil starter 3b. The fuel tank 4 includes an oil feeding pipe 4b extending upwards from the above-described exposed portion and a cap 4c detachably attached to the upper end of this oil feeding pipe 4b. Incidentally, as the cap 4c is adapted to be threaded to a male thread portion formed at the upper end outer circumference of the oil feeding pipe 4b, so that the cap 4c can be attached and detached by a manual rotational operation.

With the above-described arrangement, in the engine 3, at its portion of the coil starter 3b protrudes most to the right outer side and at the position adjacent the rear end of the coil starter 3b as seen in the plan view, the oil feeding pipe 4b and the cap 4c are disposed. In particular, the cap 4c is disposed at the position protruding most to the right outer side.

With this mower, the engine 3 and the fuel tank 4 are disposed with offset to the right side of the machine body A and at low positions also. Therefore, conventionally, when the machine body A was caused to travel in reverse at time of a work, vegetation present on the ground surface may come into hard contact with the exposed portion of the tank main body 4a or the oil feeding pipe 4b or the cap 4c, thus damaging these, or grass or the like having a low profile would get tangled with the cap 4c, thus rotating this cap 4c in the loosening direction inadvertently.

In order to resolve the above-described inconvenience, as shown in FIG. 1 and FIG. 3, there is provided a protection member 30 which bulges more outwards than an outer end position of the fuel tank 4 in the offset direction (right direction). This protection member 30 is constituted of a plate-like member whose center position in the front/rear direction as seen in the plan view bulges gently outwards and is fixed to the outer end position of the main frame 30 described above.

Further, the protection member 30 is disposed at the position which bulges more outwards in the offset direction (right direction) than the outer circumference of the cap 4c as seen in the plan view. In particularly, as shown in FIG. 1, the outer end position in the offset direction of the protection member 30 protrudes more outwards than a virtual line L which joins the outer end position in the offset direction (right direction) of the right side front wheel 1 and the outer end position in the offset direction (right direction) of the right side rear wheel 2.

With provision of such protection member 30 described above, in case vegetation or the like present on the ground surface approaches the fuel tank 4 in association with traveling of the machine body A at time of a grass mowing work, such objects will come into contact with the outer circumference of the protection member 30, so that the vegetation or the like can be pushed out smoothly in the direction away from the fuel tank 4 and the engine 3, thus preventing direction contact therebetween. As a result, no damage will occur in the engine 3, the fuel tank 4 or the oil feeding pipe 4b.

Further, as the protection member 30 comes into contact with the vegetation or the like, direct contact can be prevented and also a phenomenon of vegetation getting tangled with the oil feeding pipe 4b or the phenomenon of the cap 4c being rotated inadvertently by the contact with the vegetation, thus being detached can be avoided.

[Arrangement of Protecting Air Cleaner]

With this grass mower, conventionally, as air current generated in association with rotations of the cutter blades 14 at time of a grass mowing work would blow out to the outer side from under the vertical wall 11 of the cutter blade housing C, thus blowing up and scattering dust present on the ground surface. Further, with this mower, since the air cleaner 3c of the engine 3 is disposed at the position opposed to the rear wheel 2 and the engine 3 is disposed at the low position of the machine body A, it was also conceivable that the dust would flow upwards in the free space between the rear wheel 2 and the air cleaner 3c, thus being suctioned into the air cleaner 3c inadvertently.

If a large amount of dust were suctioned into the air cleaner 3c due to such phenomenon as above, this would lead to inconvenience of the replacement timing of the air cleaner element being advanced.

Further, in case the machine body A is caused to travel in reverse, the dust or the like present on the ground surface flipped up by the rear wheel 2 would come into contact with the air cleaner 3c, thus damaging this air cleaner 3c.

Then, in order to resolve such inconvenience as above, a dustproof member 32 is disposed at an area extending from the position downwardly of the air cleaner 3c to the position upwardly of the rear wheel 2. As this dustproof member 32, there is employed a plate member having an increased width along the left/right direction of the machine body A and the dustproof member 32 is provided with a base end portion of this dustproof member 32 located downwardly of the air cleaner 3c being fixed to the main frame 20.

With the above-described arrangement, the dustproof member 32 prevents the phenomenon of the dust being blown up in association with a grass mowing work into the space between the air cleaner 3c and the rear wheel 2 opposed to this air cleaner 3c to be suctioned into the air cleaner 3c inadvertently. Consequently, the inconvenience of the replacement timing of the air cleaner element being advanced is resolved.

Further, with the above-described arrangement, even in a situation where the dust or small stones or the like flipped up by the rear wheel 2 are scattered to the direction of the air cleaner 3c, such scattered dust or small stone can be blocked by the dustproof member 32. So, the arrangement does not invite the phenomenon of this dust being suctioned into the air cleaner 3c inadvertently or the inconvenience of the dust coming into contact with the air cleaner 3c, thus damaging this air cleaner 3c.

Other Embodiments

The present invention may alternatively be embodied as follows, in addition to the foregoing embodiment (in the following, those components having same functions as those in the foregoing embodiment are denoted with same reference marks as those used in the foregoing embodiment).

(a) The inventive arrangement may be applied to an arrangement in which the oil feeding pipe 4b is disposed to extend toward the front side of the machine body A relative to the fuel tank 4. With this arrangement, inconvenience of the vegetation or the like coming into contact with the fuel tank 4, the oil feeding pipe 4b or the cap 4c in the course of forward traveling of the machine body A can be prevented by the projection member 30.

(b) The protection member 30 may be constituted of a member formed by bending a metal member into an arcuate shape. The protection member 30 thus constituted may have its base end portion fixed to the outer end of the main frame 20 or have its base end portion supported to the fuel tank 4.

(c) The present invention may be embodied such that the air cleaner 3c is exposed to the front side of the machine body A relative to the engine 3. With this arrangement, the dust blown up from the ground surface during forward traveling of the machine body A can be blocked by the dustproof member 32, so that inadvertent suction of this duct by the air cleaner 3c can be suppressed. Moreover, since small stone flipped up by the rear wheel 2 can be blocked by the dustproof member 32, the phenomenon of small stone coming into contact with the air cleaner to damage it can be suppressed also.

(d) In the foregoing embodiment, the base end portion of the dustproof member 32 is fixed to the main frame 20. Instead of this, it may be supported to the engine 3 which is disposed more upwardly than the main frame 20. And, this dustproof member 32 may be configured to be attachable/detachable with a bolt or the like.

(e) The present invention is applicable to a lawn mower in addition to a grass mower. And, even when the invention is applied to a lawn mower, the advantageous functions/effects described the foregoing embodiment can be achieved also.

INDUSTRIAL APPLICABILITY

The present invention is applicable to a work machine having front wheels and rear wheels, with an engine and a fuel tank being disposed at positions offset to one side in the left/right direction of the machine body and also to a work machine having front wheels and rear wheels, with an engine being disposed at a position offset to one side in the left/right direction of the machine body.

DESCRIPTION OF REFERENCE SIGNS

1: front wheel
2: rear wheel
3: engine
3c: air cleaner
4: fuel tank
4b: oil feeding pipe
4c: cap
30: protection member
32: dustproof member
L: virtual line

The invention claimed is:

1. A work machine comprising:
a machine body that can travel with left and right front wheels and left and right rear wheels;
an implement supported to the machine body;
an oil feeding pipe which extends upwards from the outer end position of the fuel tank in the offset direction as seen in the plan view; and
a cap detachably attached to an upper end of the oil feeding pipe;
wherein an engine driving the front wheels, the rear wheels and the implement and a fuel tank reserving fuel for the engine are disposed between the front wheels and the rear wheels in a front/rear direction of the machine body and at positions offset to further outer side than the left/right center of the machine body,
wherein there is provided a protection member which protrudes to a further outer side than an outer end position of the fuel tank in an offset direction as seen in a plan view, and
wherein the protection member is disposed to protrude to the further outer side in the offset direction than an outer circumference of the cap.

2. The work machine of claim 1, wherein as seen in the plan view, an outer end position of the protection member in the offset direction protrudes to further outer side than a virtual line which joins an outer end position of the front wheels in the offset direction and an outer end position of the rear wheels in the offset direction.

3. The work machine of claim 1, wherein the protection member comprises a plate-like member having an arc-shaped outer edge which bulges gently at its center position in the front/rear direction as seen in the plan view.

4. A work machine comprising:
a machine body that can travel with left and right front wheels and left and right rear wheels; and
an implement supported to the machine body,
wherein an engine driving the front wheels, the rear wheels and the implement and a fuel tank reserving fuel for the engine are disposed between the front wheels and the rear wheels in a front/rear direction of the machine body and at positions offset to further outer side than the left/right center of the machine,
wherein there is provided a protection member which protrudes to a further outer side than an outer end position of the fuel tank in an offset direction as seen in a plan view, and
wherein as seen in the plan view, an outer end position of the protection member in the offset direction protrudes to further outer side than a virtual line which joins an outer end position of the front wheels in the offset direction and an outer end position of the rear wheels in the offset direction.

5. The work machine of claim 4, wherein the protection member comprises a plate-like member having an arc-shaped outer edge which bulges gently at its center position in the front/rear direction as seen in the plan view.

6. A work machine comprising:
a machine body that can travel with left and right front wheels and left and right rear wheels; and
an implement supported to the machine body,
wherein an engine driving the front wheels, the rear wheels and the implement and a fuel tank reserving fuel for the engine are disposed between the front wheels and the rear wheels in a front/rear direction of the machine body and at positions offset to further outer side than the left/right center of the machine,
wherein there is provided a protection member which protrudes to a further outer side than an outer end position of the fuel tank in an offset direction as seen in a plan view, and
wherein the protection member comprises a plate-like member having an arc-shaped outer edge which bulges gently at its center position in the front/rear direction as seen in the plan view.

* * * * *